United States Patent [19]

Walker

[11] 4,037,048

[45] July 19, 1977

[54] PROCESS FOR THE INTERPRETATION OF REMOTELY SENSED DATA

[75] Inventor: John E. Walker, Buffalo, N.Y.

[73] Assignee: Calspan Corporation, Buffalo, N.Y.

[21] Appl. No.: 351,414

[22] Filed: Apr. 19, 1973

[51] Int. Cl.[2] ........ H04N 7/18

[52] U.S. Cl. ........ 358/113; 358/93

[58] Field of Search ........ 178/DIG. 8, 6.8

[56] References Cited

PUBLICATIONS

Piech, Kenneth R. and John E. Walker, "Thematic Mapping of Flooded Acreage", Photogrammetric Engineering, Nov. 1972, pp. 1081–1090 and color photograph.

Mees, C. E., Kenneth, *The Theory of the Photographic Process*, Revised Edition, New York: Macmillan, 1963, 952–955, 968, 969.

Data Users Handbook, *NASA Earth Resources Technology Satellite*, General Electric Report 71–SD–4249, Revision of Nov. 17, 1972.

Billingsley, F. C., A. F. H. Goetz and J. N. Lindsley, "Color Differentiation by Computer Image Processing", Photographic Science and Engineering, vol. 14, No. 1, Jan. - Feb. 1970, pp. 28–35.

Chandler, P. B., W. I. Dowdy and D. T. Hodder, Study to Evaluate the Utility of Aerial Surveillance Methods in Water Quality Monitoring, California State Water Resources Control Board, Sept. 1970, 5–12, 19, 20, 29–34, 45–50, 69–71, 78–80, VI–2 and VI–3.

*Primary Examiner*—Howard W. Britton
*Attorney, Agent, or Firm*—David J. Zobkiw; Allen J. Jaffe

[57] ABSTRACT

A process for interpreting remotely sensed data to determine the nature and presence of several conditions. Data sensed at two different wave bands are mathematically divided to determine the ratio of the energies coming from the observed object at the two wave bands. Unlike density addition or subtraction which furnish only the difference in the densities on the film, the step of mathematical division produces a change in pattern as well as density. The changes in the pattern can be interpreted to provide additional information from the data.

10 Claims, 2 Drawing Figures

PROCESS FOR THE INTERPRETATION OF REMOTELY SENSED DATA

Areas for the usage of remote sensors include the fields of civil engineering, geography, agriculture, forestry, land management, geology, hydrology and oceanography. Specific applications would include the determination of vegetation density, grass/brush/timberland interfaces, plant species and vigor, land use, topographical mapping, mineral deposits, water pollution, thermal conditions and biological phenomena. The potential remote sensors for surveying thse earth resources are varied and would include multispectral scanners, multiband synoptic cameras, high resolution televison, seismographs, infrared radiometer/spectrometers, radar imagers, and laser altimeter/scatterometers.

Airplanes, and more recently satellites, have made possible the acquisition of vast amounts of data by remote sensors. Although significant advances have taken place, the utility of much of the data obtained from remote sensors is limited by the techniques and apparatus available for the interpretation of the data obtained. As a result, to a large degree, full utilization cannot be made of the currently available data due to a lack of suitable techniques for the interpretation of the data.

It is an object of this invention to provide techniques whereby a set of remotely sensed data may be used to determine the nature of the presence of several conditions.

It is an additional object of this invention to provide a technique for photometric image interpretation wherein color aerial photographs are calibrated so that any image density in the scene is related to the spectral reflectance of the corresponding group object and these properties are used to extract additional information about the object's physical properties.

It is a further object of this invention to provide a technique to determine vegetative, soil and water conditions from a set of remotely sensed data. These objects, and others as will become apparent hereinafter, are accomplished by the present invention.

Basically the present invention provides a process for the interpretation of remotely sensed data which comprises sensing data in a plurality of wave bands by means of remote sensors, adjusting the sensed data to correct for non-linearity of the remote sensors, dividing an adjusted signal at a first selected one of the plurality of wave bands by an adjusted signal at a second selected one of the plurality of wave bands, thresholding a signal representing the result of the division, displaying the thresholded signal comparing the displayed signal with the original data and interpreting the differences.

BRIEF DESCRIPTION OF THE DRAWINGS

For a fuller understanding of the present invention, reference should now be had to the following detailed description thereof taken in conjunction with the accompanying drawings wherein.

DESCRIPTION OF THE PREFERRED EMBODIMENT

Figure 1:
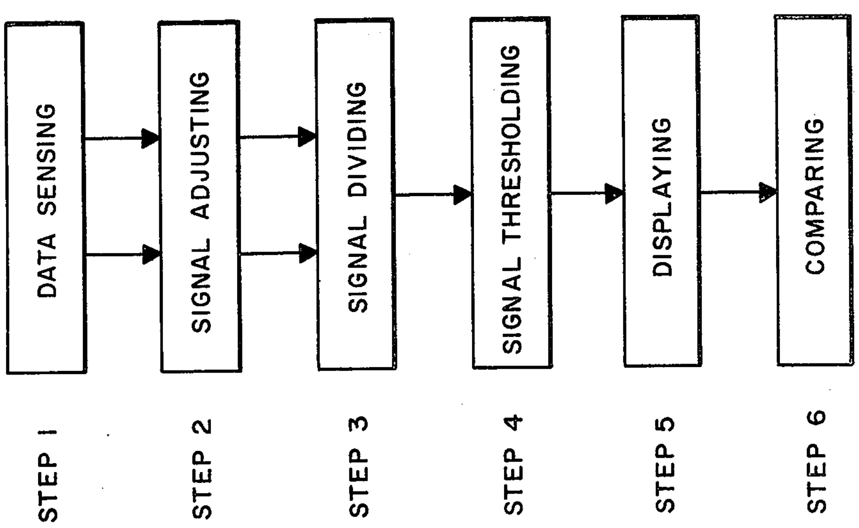
FIG. 1 is a flow diagram illustrative of successive steps in the method of data interpretation.

As shown in the flow diagram of FIG. 1, the first step is data sensing in which a remote sensor senses data in a plurality of wave bands in the range of $\lambda^{\circ}-\lambda_{\infty}$. Typical sensors and their outputs are discussed in:

1. Chandler, P. B., W. L. Dowdy and D. T. Hodder, *Study to Evaluate the Utility of Aerial Surveillance Methods in Water Quality Monitoring,* California State Water Resources Control Board, Sept. 1970;
2. Rib, Harold T. and Robert D. Miles, "Automatic Interpretation of Terrain Features," Photogrammetric Engineering, Vol. 35, No. 2 (1967) 153–164;
3. National Research Council, Committee on Remote Sensing for Agriculture Purposes, *Remote Sensing With Special Reference to Agriculture and Forestry.* Washington: National Academy of Sciences, 1970;
4. Data Users Handbook, *NASA Earth Resources Technology Satellite.* General Electric Report 71-SD-4249, Revision of November 17, 1972; and
5. Howard, John A., *Aerial Photo-Ecology,* New York: American Elsevier Publishing Co., 1970.

The second step is signal adjusting in which data supplied by the remote sensor in a pair of bands in the range of $\lambda^{\circ}-\lambda_{\infty}$ is corrected so as to compensate for sensor non-linearity. The adjusting of film images and signals on magnetic tape and the need therefor are taught by:

1. Mees, C. E. Kenneth, *The Theory of the Photographic Process,* Revised Edition, New York: Macmillian, 1963;
2. Piech, Kenneth R. and John E. Walker, "Thematic Mapping of Flooded Acreage", Photogrammetric Engineering, November 1972, 1081-1090;
3. Data Users Handbook, supra;
4. Billingsley, F. C., A. F. H. Goetz and J. N. Lindsley, "Color Differentiation by Computer Image Processing," Photographic Science and Engineering, Vol. 14, No. 1, January - February 1970; and
5. Chandler, supra.

The third step is signal dividing in which the two corrected signals are mathematically divided. Signal division is taught by:

1. Billingsley, supra;
2. Sheppard, Joseph J., Jr., Roy M. Stratton and Carl Gazley, Jr. *Pseudocolor as a Means of Image Enhancement,* January 1969;
3. Pierch, supra; and
4. "Two Stage Masking", Dupont Graphic Arts Handbook, Vol. 2.

The fourth step is signal thresholding in which the signal representing the quotient of the division is converted from an analog to a digital signal. The fifth step is displaying in which the divided signals, at the threshold range or level, are displayed. The reading out and displaying of density values are taught by:

1. Billingsley, supra;
2. Chandler, supra;
3. Data Users Handbook, supra;
4. Sheppard, supra;
5. Su, M. Y. et al, Statistical Algorithms and Computer Programs for Analysis of Multi-Spectral Observations, National Aeronautics and Space Administration CR-103182, 1970;
6. National Research Council, supra;
7. Piech, supra; and
8. Rib, supra;

The sixth step in comparing the displayed and the original data and interpreting the differences. The comparing and interpretation of data is taught by:

1. National Research Council, supra;
2. Spurr, Stephen, H., Photogrammetry and Photo-Interpretation, Second Edition, New York: Ronald Press, 1960;
3. Rib, supra; and
4. Piech, supra.

EXAMPLE I

The techniques of the instant invention may be applied to data obtained by a multispectral camera in order to obtain information as to the vitality of vegetation, water depth, surface pollution and the texture and moisture conditions of any surface.

A multispectral camera is any camera or array of multiple cameras capable of recording data using either black and white film with filters, or color film, from an air or space borne platform. A multispectral camera is used where the differentiation of areas having slightly different spectral reflectance characteristics is desired. These differences are detected by comparing two photographs each taken in a specific band. The number of bands and the specific bands chosen will depend upon the specific information sought. Since color film has emulsion layers corresponding to the colors near infrared, red, green and blue it is possible to separate the various colors.

Figure 2:
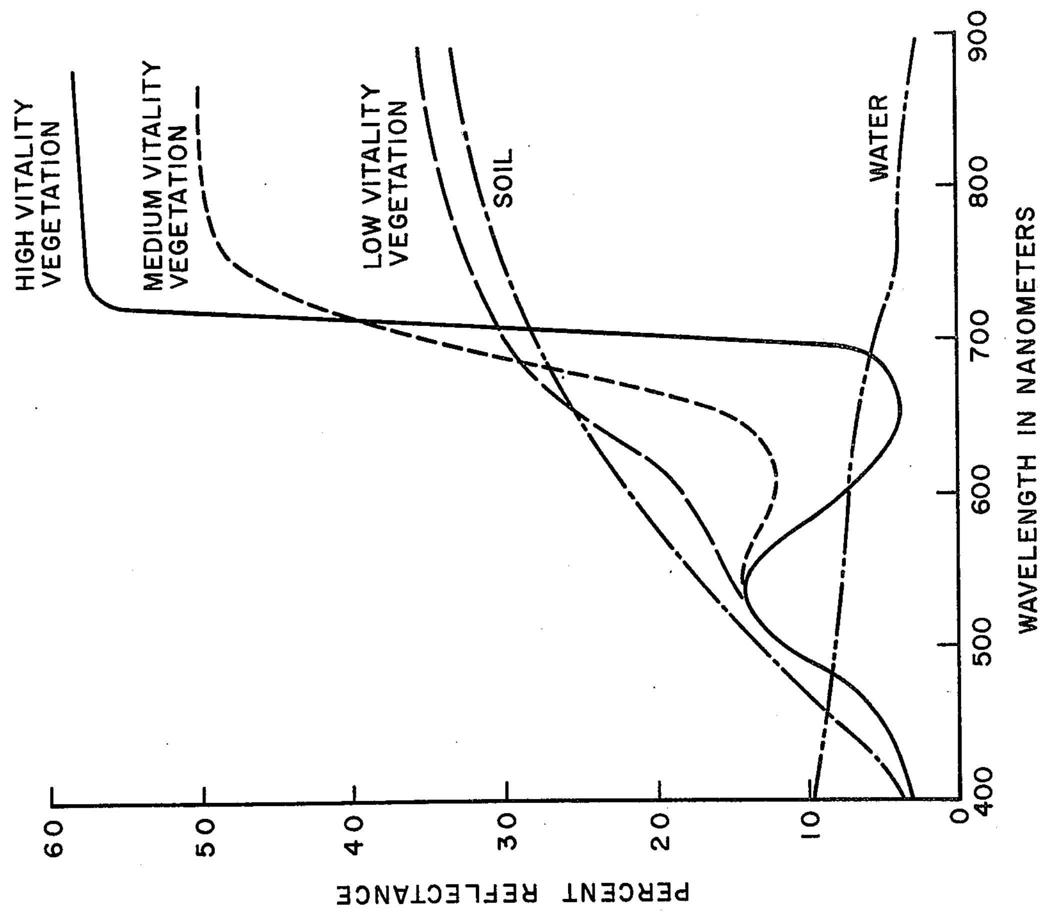
FIG. 2 is a graph on which are plotted the spectral signatures of water, soil, and high, medium and low vitality vegetation.

If the information sought relates to the vitality of vegetation as well as the condition/distribution of the soil and water, the 600–700 nanometer (nm) and the 700–900 nm bands which correspond to red and infrared, respectively, are chosen as the data inputs. As is clearly shown in FIG. 2, vegetative reflectance exhibits a steep curve in these bands which relate to vegetative chlorosis conditioned (stress by numerous factors). The texture and moisture conditions of any surface are revealed by the 400–500 nm and 600–700 nm bands. Land, water and vegetation separation is best achieved using the 500–600 nm and 700–900 nm combination.

The data output of the data sensing step are the densities of images on film which may be either filtered black and white or color. The film images are adjusted to compensate for sensor non-linearity in the signal adjusting step since the film images are attenuated by the atmosphere, by the camera, by the film processing system, by the atmospheric transmittance, by the sunlight and skylight irradiance, by the air light and step wedge image. A more detailed explanation of the process of compensating for sensor non-linearity is set forth in application Ser. No. 366,913 filed June 4, 1973 now U.S. Pat. No. 3,849,006 and assigned to a common assignee.

The signal dividing step is one of photographic division. A separation negative is made to adjust for atmospheric transmittance, sunlight and skylight irradiance and air light. The resultant density on the film relates directly to the bi-directional reflectance of the object. A positive is made of one of the signals and a negative is made of the other. The positive and negative are overlain and registered. In the resulting third transparancy, the density relates to the ratio of reflectance on the ground. The resulting third transparancy, or ratio mask, is then subjected to the step of signal thresholding.

The thresholdng process may take the form of density slicing in which a TV camera measures the density, assigns a color and displays the result on a color monitor as the displaying step. Alternatively, the ratio mask is density sliced photographically using density contour film or else by the use of conventional density slicing masks wherein numerous black and white or color reflectance ratios are thresholded and displayed.

The display presented is interpreted by comparing the new patterns with the original data which in this case would be a picture.

EXAMPLE II

The techniques of the instant invention may be applied to data obtained by the use of a scanning photometer or multi spectral scanners. The data output of the data sensing step will be in the form of signals on magnetic tape. The intensity and gain of the signals are controlled in the signal adjusting step in order to compensate for sensor non-linearity. The signal division step is performed in a division circuit. The signal thresholding step is an analog to digital conversion from the magnetic tape and associated computer selection programs. The displaying step is a computer directed playback of the divided signals and threshold range or level, with the level also displayed numerically or in color for any $x$, $y$ coordinate of the original scene.

Although preferred embodiments of the present invention have been illustrated and described, other changes will occur to those skilled in the art. It is therefore intended that the scope of the present invention is to be limited only by the scope of the appended claims.

I claim:

1. A process for the interpretation of remotely sensed data including the steps of:

sensing data in a plurality of wave bands by means of remote sensors;

adjusting the sensed data to correct for non-linearity of the remote sensors;

dividing an adjusted signal at a first selected one of the plurality of wave bands by an adjusted signal at a second selected one of the plurality of wave bands;

thresholding a signal representing the result of the division;

displaying the thresholded signal; and comparing the displayed signal with original data and interpreting the differences.

2. The process of claim 1 wherein the remote sensor is a multispectral camera and the sensed data is in the form of the densities of images on film.

3. The process of claim 1 wherein the remote sensor is a multispectral scanner and the sensed data is in the form of signals on magnetic tape.

4. The process of claim 1 wherein the step of dividing the two selected signals is one of photographic division.

5. The process of claim 1 wherein the step of thresholding includes changing the signal representing the result of the division from an analog to a digital signal.

6. The process of claim 1 wherein the step of thresholding includes density slicing.

7. The process of claim 1 wherein said selected bands are 400–500 nm and 600–700 nm whereby the texture and moisture conditions of the image source may be determined.

8. The process of claim 1 wherein said selected bands are 500–600 nm and 700–900 nm whereby land, water and vegetation separation of the image source may be determined.

9. The process of claim 1 wherein said selected bands are 600–700 nm and 700–900 nm whereby the vitality of vegetation and the condition and distribution of soil and water may be determined.

10. The process of claim 9 wherein the remote sensor is a multispectral camera and the step of dividing the two selected signals is one of photographic division.

* * * * *